(12) United States Patent
Howe et al.

(10) Patent No.: US 6,446,199 B1
(45) Date of Patent: Sep. 3, 2002

(54) DISK DRIVE INCOMPATIBLE FIRMWARE RECOVERY

(75) Inventors: Steven Michael Howe; Jack Charles Kruger, both of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/469,420

(22) Filed: Jun. 6, 1995

(51) Int. Cl.[7] .............................. G06F 9/00; G06F 9/24; G06F 15/177; H02H 3/05
(52) U.S. Cl. ............................... 713/1; 713/100; 714/6
(58) Field of Search .................. 713/1, 100; 714/2, 714/6

(56) References Cited

U.S. PATENT DOCUMENTS

| | | | |
|---|---|---|---|
| 5,202,984 A | 4/1993 | Kashio | 395/600 |
| 5,241,672 A | 8/1993 | Slomcenski et al. | 395/600 |
| 5,450,589 A | 9/1995 | Maebayashi et al. | 395/700 |
| 5,598,563 A * | 1/1997 | Spies | 713/2 |
| 5,664,177 A * | 9/1997 | Lowry | 707/100 |
| 5,664,195 A * | 9/1997 | Chatterji | 395/712 |
| 5,802,365 A * | 9/1998 | Kathail et al. | 709/301 |
| 5,819,107 A * | 10/1998 | Lichtman et al. | 710/8 |
| 6,081,850 A * | 6/2000 | Garney | 710/15 |

FOREIGN PATENT DOCUMENTS

| | | |
|---|---|---|
| EP | 0472433 | 2/1992 |
| JP | 407244628 A * | 9/1995 |
| WO | 9408289 | 4/1994 |

* cited by examiner

Primary Examiner—Thomas Lee
Assistant Examiner—Chun Cao
(74) Attorney, Agent, or Firm—Matthew J. Bussan

(57) ABSTRACT

In a disk type data storage device wherein the firmware used to control the device is partitioned with a first portion stored in the control circuitry and a second portion stored in the reserved area of the disk surface, the replacement of one of the portions in the field may cause the drive to have different levels or releases of firmware that will not function together. This disables the drive until diagnosed and connected. The structure disclosed includes identifiers associated with the firmware portions and the provision of a copy of the firmware first portion as well as the firmware second portion on the disk. The firmware first portion on the disk is normally never accessed and is a version compatible with the firmware second portion on the disk. During the power up sequence, the identifiers are checked for compatibility and the sequence normally continues. In the event that a portion of the firmware has been replaced and a finding of incompatibility occurs, the ROM, first portion of firmware (stored in electrically erasable, electrically programmable read only memory) in the control circuitry is erased and replaced by the firmware first portion stored on the disk. The firmware portions are thereupon compatible and drive operation continues without user intervention or awareness of the problem except for a one time, modest lengthening of the power on sequence.

9 Claims, 4 Drawing Sheets

DISK DRIVE INCOMPATIBLE FIRMWARE RECOVERY

FIELD OF THE INVENTION

The present invention pertains to disk type data storage devices and more particularly to a structure and technique for accommodating replacement assemblies having different levels of firmware partitions without, operator intervention.

BACKGROUND OF THE INVENTION

A disk drive that must function as a single entity with respect to the using system is commonly partitioned into two parts a sealed head-disk assembly including the precision mechanical portions and some few electronic functions disposed within the enclosure and the principal electronic control circuits which are mounted outside the enclosure. It is also a regular practice to make these portions of the disk drive independently replaceable so that damage or failure associated with one portion does not require replacement of both.

A further practice used in controlling the device is to partition the drive firmware. The code that must be continuously available and accessible at high speed is included in the flash memory in the control circuitry as electrically erasable, electrically programmable read only memory. Other portions of the control firmware, that are less regularly and alternatively used, are stored in the reserved area on the disk media and swapped into and out of volatile random access memory (RAM).

The short design cycles and rapid technical change associated with disk drives results not only in a rapid sequence of new product introductions, but also in continuous upgrades in current products to extend the competitive life. With the drive firmware partitioned between two field replaceable units (FRUs), the controller hardware and the head-disk enclosure, there must be assurance that the firmware portions are compatible and will function together. Thus, if one of the field replaceable units is replaced, it is possible that a disabling incompatibility will occur. In this event either the drive or the entire system will fail to function until the difficulty is diagnosed and the drive made not only operative, but compatible firmware installed. There has previously been a recognition and accommodation of the problem occasioned by the presence of incompatible firmware partitions. The resolution has been to disable the data write function, but to allow data to be read, if the read can be accomplished successfully. However, this causes the drive to be at least partially disabled until the user corrects the condition, or more likely, has the system serviced to correct the problem. With nontechnically oriented users, systems and auxiliary equipment must solve problems such as device compatibility without user intervention. For the system and the drive to be user friendly, such problems must be resolved without user awareness that the condition occurred.

SUMMARY OF THE INVENTION

In a drive incorporating the present invention, the firmware is partitioned between a read only memory (ROM) portion or partition stored in the drive controller electronics in electrically erasable, electrically programmable read only memory and the RAM portion or partition of the firmware is stored on the disk media in the reserved area. However, a copy of the ROM portion of the firmware is also stored on the disk media which is a version compatible with the firmware RAM portion stored on the media. In normal operation, the ROM portion stored on the media would never be accessed. Each of these firmware portions or partitions contains an identifier that indicates the level of the firmware partition and the levels of the other partitions with which it is compatible.

When drive power is turned on, the spindle is accelerated to operating speed, whereupon the firmware identifiers are checked for compatibility. If compatibility exists, the start up sequence continues through the various checks, tests and verifications to achieve a ready state and enable data read and write commands to be executed.

If the check of firmware identifiers indicates the presence of incompatible firmware parts as a result of the installation of an updated or different level replaceable unit, the compatible ROM portion of the firmware stored in the reserved area of the disk media is reprogrammed into the flash memory. Normal operation of the drive is thereupon restored without operator intervention.

DETAILED DESCRIPTION

Figure 1:
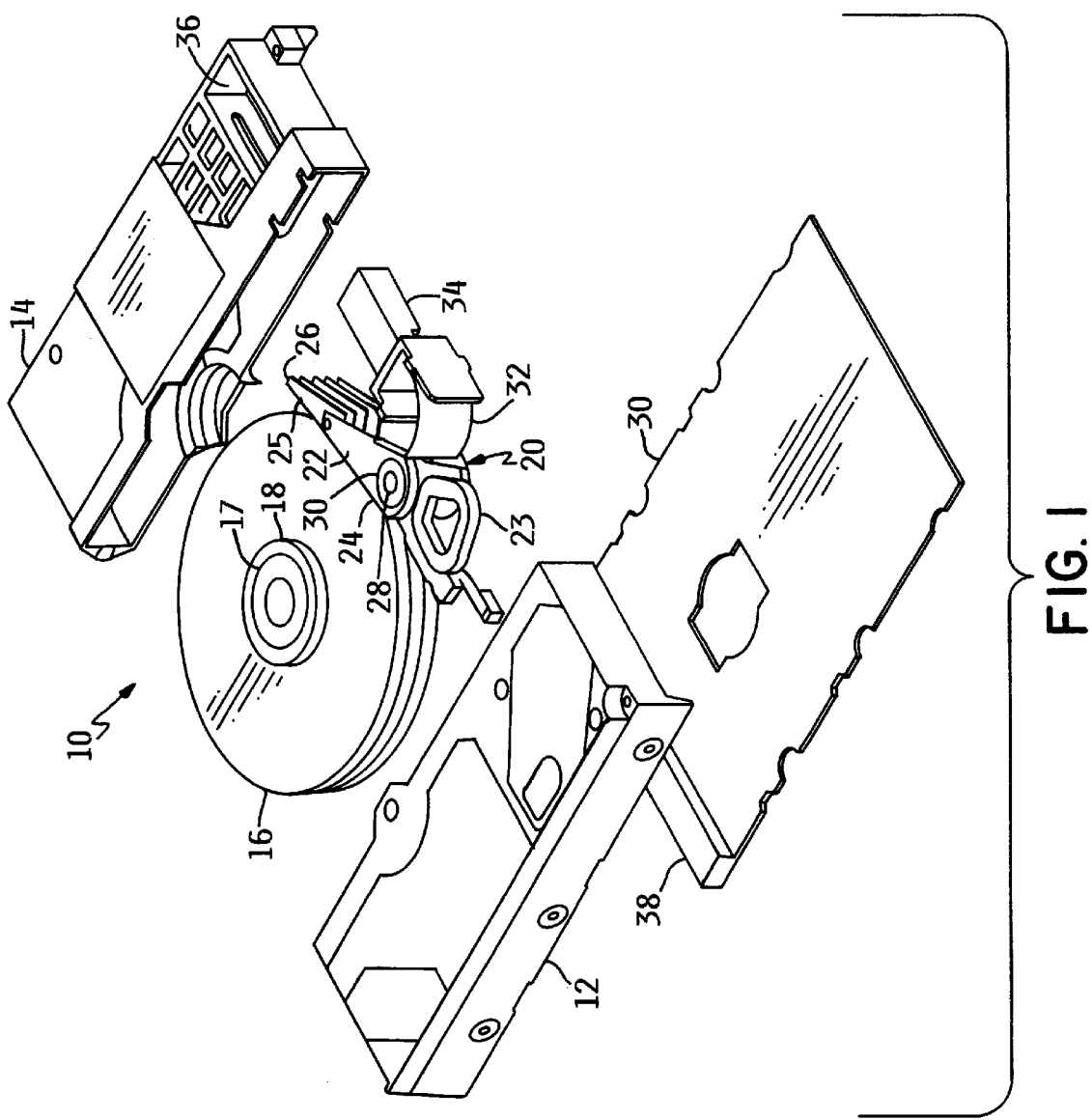
FIG. 1 is an exploded schematic view of a typical disk drive that incorporates the present invention.

FIG. 1 is an exploded view of a typical large capacity hard disk storage device 10 incorporating the present invention. Drive 10 includes a pair of cast housing portions 12, 14 which enclose and seal the head disk assembly. As shown, four disks 16 are supported on a hub 17 and secured by a clamp 18 as a disk assembly for rotation in unison. The hub 17 also forms a portion of the spindle motor rotor assembly with such spindle motor being positioned concentrically within the stack of disks 16. The disk stack and spindle motor assembly is supported between the upper and lower wall portions of housing 12. The actuator assembly 20 includes a cast comb or E block 24 which presents a series of five arms 22 at one side and a voice coil 23 at the opposite side. Attached to each arm 22 are one or two load beam suspensions 25 that support at the distal end a transducer carrying slider 26. The actuator assembly 20 is rotated by a voice coil motor that includes a permanent magnet and pole pieces within housing 12 that form a magnetic gap in which the voice coil 23 is positioned in the assembled condition. Actuator assembly 20 pivots about a shaft 28 upon which it is supported by a pair of bearings 30 (one of which is visible). Shaft 28 is supported within housing portion 12 between the upper and lower wall portions. Data signals are transmitted between the transducers and the device electronics on circuit board 30 and power is delivered to voice coil 23 using a flex cable 32. The head disk assembly is sealed within the housing portions 12 and 14 by a malleable metal tape that overlies the junction between the assembled housing portions. The flex cable 32 terminates at a connector 34 which extends from the head disk enclosure into a recess 36 that is open at top and bottom to permit attachment to the electronic circuits on card 30. Card 30, shown schematically, is mounted on the assembled head disk enclosure, supports all the drive electronics which reside outside the head disk enclosure, and includes a connector 38 at one edge that connects the drive to the host system.

Figure 2A:
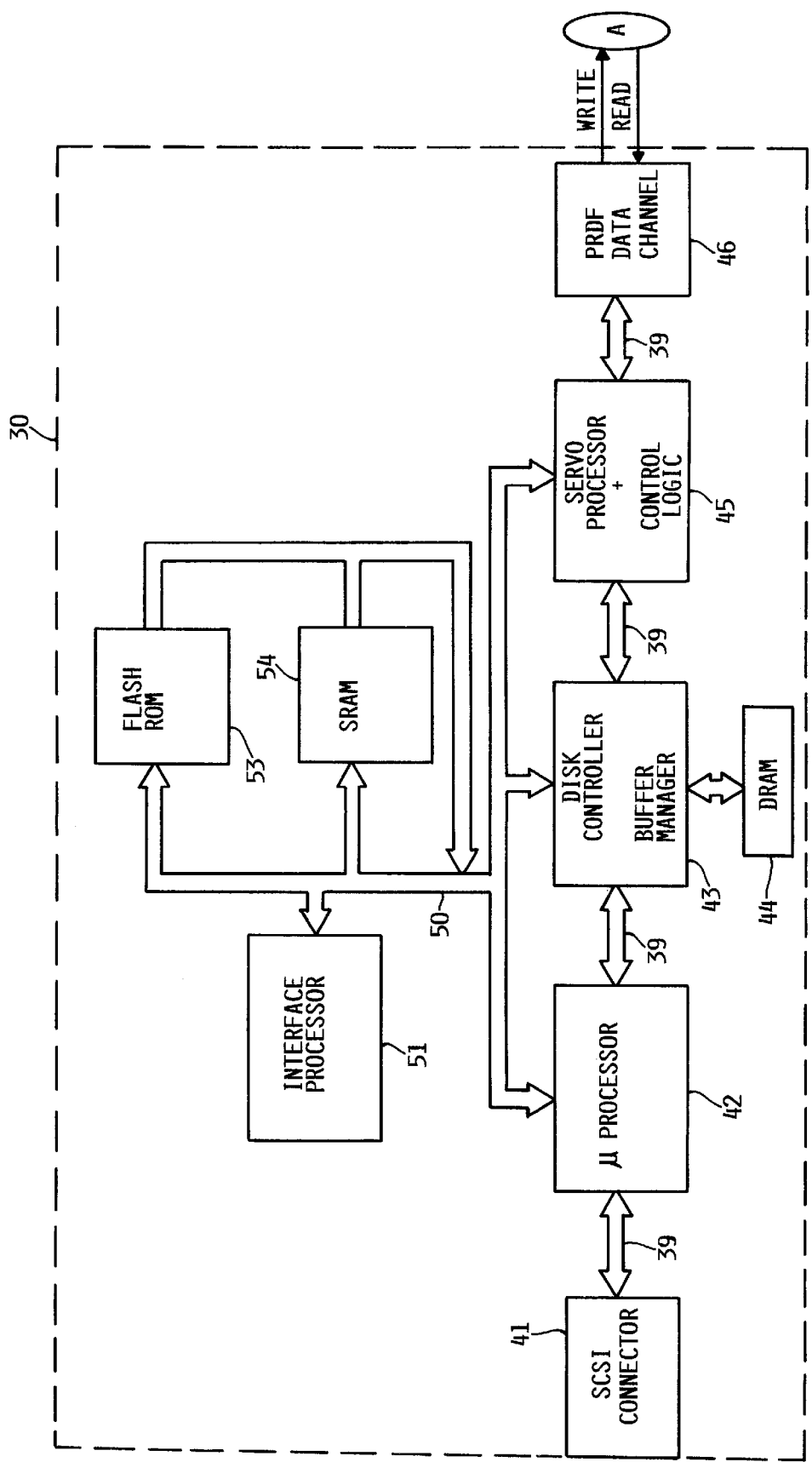
FIG. 2 is a block diagram showing the principal electrical components of the circuit card and disk enclosure of the drive of FIG. 1 illustrating the data paths.
Figure 2B:
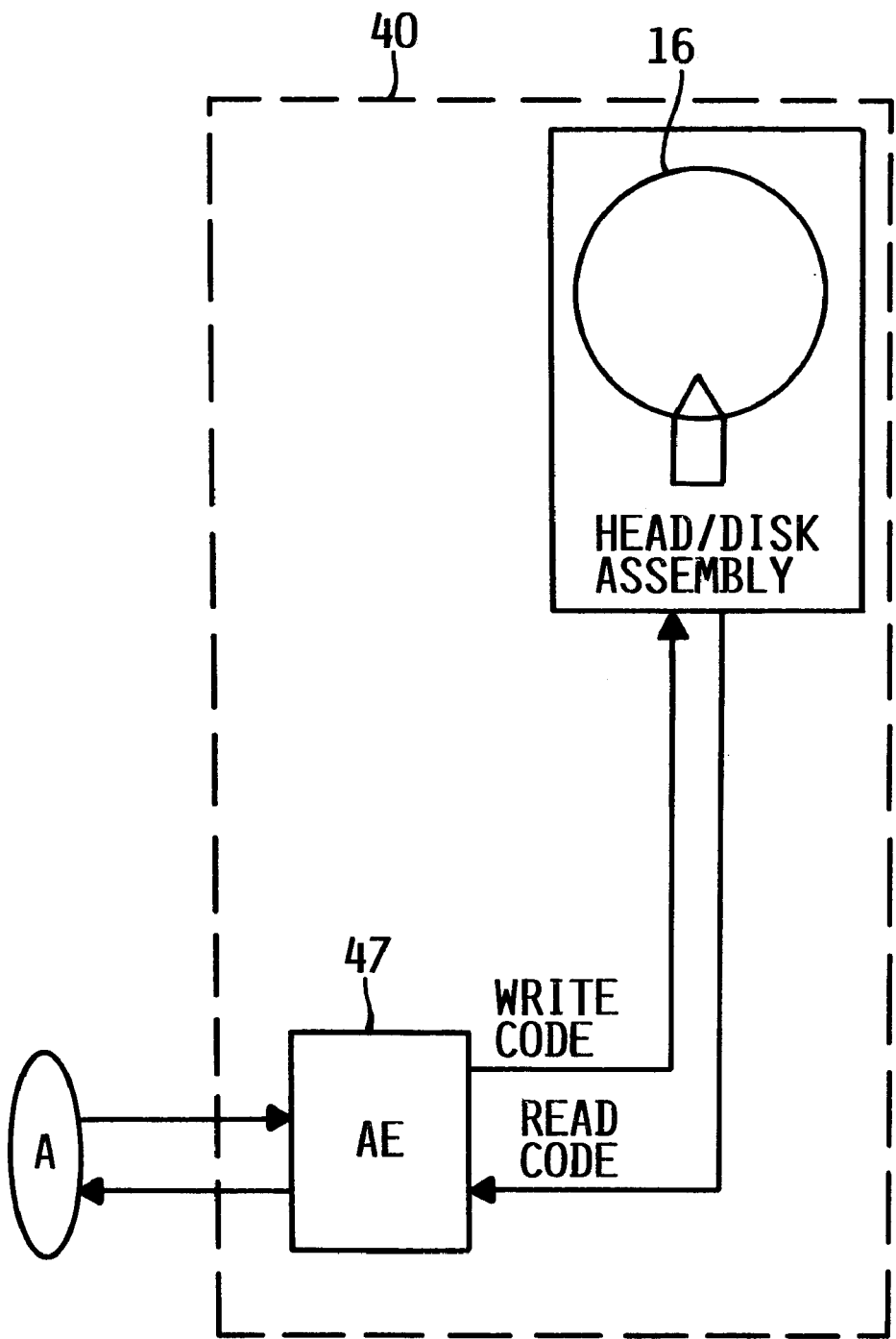

FIG. 2 is a schematic block diagram showing the principal data paths associated with the disk drive of FIG. 1 with the components residing on the card 30 or included in the head disk enclosure 40. The user data moves along the two way path, using the bus segments 39 from the host system via the SCSI connector 41, through microprocessor 42 and disk controller/buffer manager 43 to dynamic random access memory (DRAM) 44. From DRAM 44 and disk controller 43 data moves through control logic 45 and the partial response digital filter (PRDF) data channel 46 to the arm electronics (AE) 47 within the head disk enclosure 40. From arm electronics 47 the encoded data is written on the data portion of the disk surface. To read data from the disk surface, the above sequence is reversed to transmit data from the data surface to the host system.

Another bus 50 interconnects interface processor 51, microprocessor 42, disk controller 43 and servo processor 45 with one another and with flash ROM 53 and static random access memory (SRAM) 54. All of these components also communicate with the stored data on the disk surface reserved are In operating the disk drive, the flash ROM 53 must contain sufficient firmware code to initiate drive operations, bring the disk spindle assembly to operating rotational velocity and read data stored in the reserved area to load the SRAM 54. The firmware used the operate the drive is partitioned into two parts, a first portion that is resident in flash ROM 53 and a second part that is stored on the reserved area of the disk media and read out to load the SRAM 54 or swapped into and out of SRAM 54 as needed.

The reserved areas on the disk data storage surface contains massive amounts of data associated with the drive function. In addition to the stored RAM data used to load and swap data into the RAM storage of the control circuitry, the nonvolatile disk storage includes support data that identifies the drive, its history and the level of technology it contains. Also included are extensive data and tables relating to the error history of each slider disk combination including with respect to each error, the location time (in power on hours of operation) type and source of each, the level of recovery used (which may include 150 levels) and the number of retries associated with each. In addition, much of the data is stored redundantly to assure recovery in the event of an unrecoverable failure. Thus, reserved area disk storage is a resource that is extensive and available for enhancing the quality of drive operation.

The present invention addresses the problem associated with the presence of noncompatible firmware caused by the replacement of a field replaceable unit (FRU) that contains a level or release of a firmware partition that is not compatible with the other partition or partitions of the firmware. This may be caused by replacement of the electronics card with a card having differing flash ROM software. The invention is also applicable if the head disk enclosure is replaced.

In practicing the present invention, the disk surface reserved area contains not only the firmware second portion which is read and loaded into SRAM 54, but also includes a copy of the firmware first portion which normally resides in the flash ROM 53. This copy of the first portion is a level that is compatible with the firmware second portion, stored on and regularly accessed from the disk. The disk reserved area first firmware portion copy is normally never accessed In addition, each firmware partition contains an identifier which indicates the level and release of the associated partition and the levels of the other, cooperating firmware partitions with which it will function. This may be in the form of a byte of data identifying the firmware level of the partition of which it forms a part and can include additional data bytes identifying the level or levels of other firmware partitions with which it will function correctly.

Figure 3:
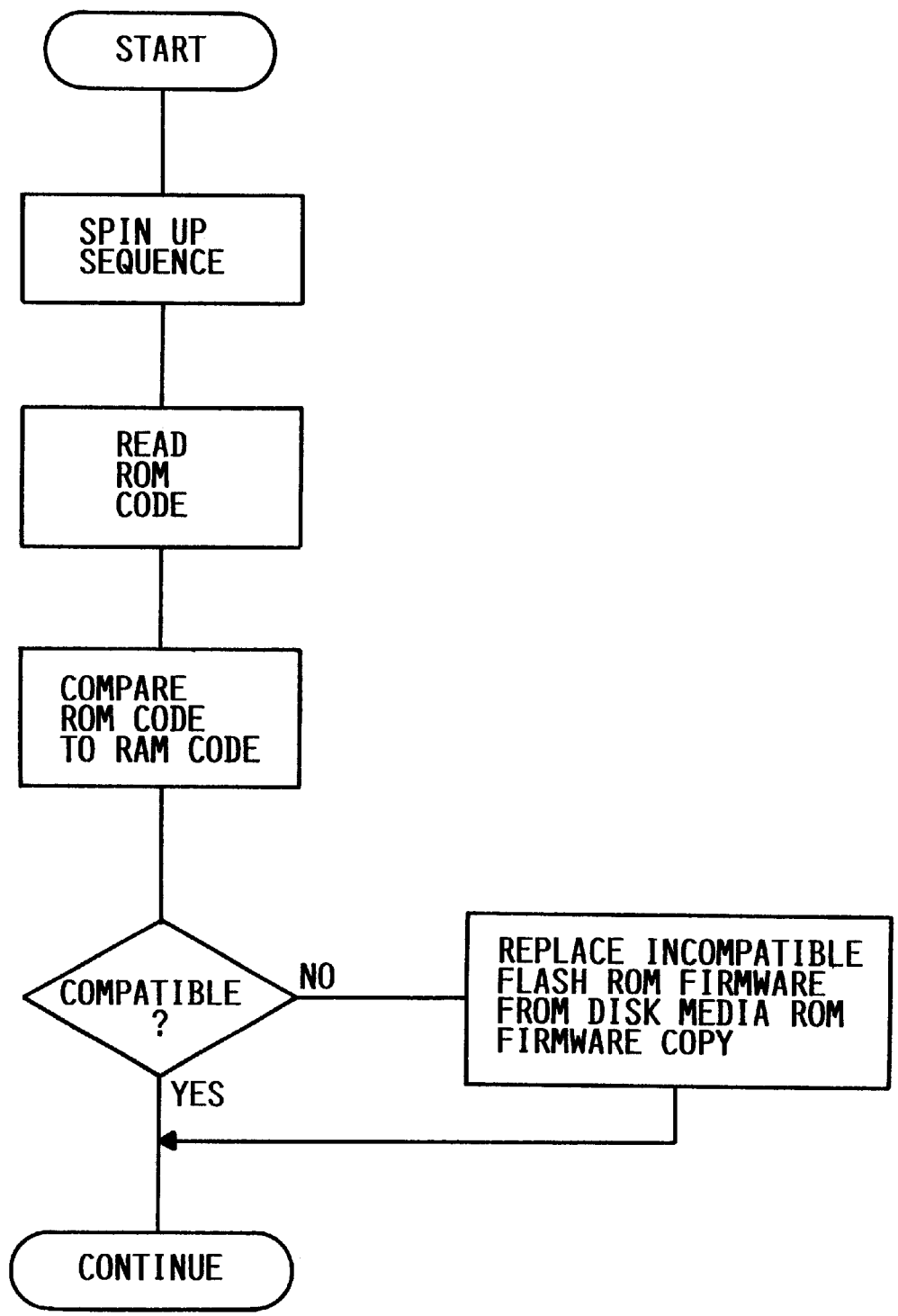
FIG. 3 is a flow diagram including the portion of the start sequence that includes the invention.

The flow chart of FIG. 3 illustrates the pertinent part of the start sequence during which the present invention is employed. The start sequence begins as power is turned on to the drive. Initially the spin up sequence is initiated to accelerate the disks to an operational rotational velocity. When the disk is readable, the flash ROM code identifiers are compared to the RAM code identifiers to determine compatibility. Normally, compatibility will be found and the stan up sequence will continue. If incompatibility is found, either through a replacement of the circuit card containing a different level of firmware or the less likely replacement of the head disk enclosure, the flash memory 53 is reprogrammed by erasing the electrically erasable. electrically programmable read only memory (EEPROM) and reprogramming using the firmware first portion copy in the reserved area of the disk. The start sequence thereupon continues to bring the disk drive to a ready state. The problem is thereupon corrected without any intervention by the operator or user. The user would in all probability be unaware that this normally disabling condition had occurred.

The invention can be used to overcome incompatibility problems associated with any programmable function. For example, in addition to the drive control code, the servo code may be contained in the flash ROM 53, whereby a replacement circuit card with an altered servo code will also be accomodated in a manner transparent to the user.

While the invention has been particularly shown and described with reference to a preferred embodiment thereof, it will be understood by those skilled in the art that various changes in form and details may be made therein without departing from the spirit and scope of the invention.

What is claimed is:

1. In a disk drive data storage device wherein firmware used to control drive operation is paritioned into a first portion stored in the controller electronics that is subject to replacement independent of the head-disk assembly (HDA) and a second portion, which must be compatible with said first portion, stored on the disk media with portions thereof swapped into and out of volatile random access memory (RAM) as required during drive operation, the improvement comprising:

copy of said firmware first portion which is stored on said disk media, said copy being compatible with the said firmware second portion stored on said disk media;

means for determining whether the said firmware first portion stored in said controller electronics and said firmware second portion stored on said disk media are compatible; and means, responsive to a determination of incompatibility, for replacing said firmware first portion stored in said controller electronics with said firmware first portion copy stored on said disk media.

2. The disk drive data storage device of claim 1 further comprising an identifier forming a part of each said firmware portion which indicates the technical level of the firmware portion of which it forms a part, whereby a comparison of said identifiers are used to determine the compatibility of the firmware portions.

3. The disk drive data storage device of claim 2 wherein each identifier further includes data indicating which other firmware portions are compatible with the portion of which it forms a part.

4. The disk drive data storage device of claim 1 further including means for invoking said means for determining the compatibility of said firmware first and second portions on each occasion that power to the drive is turned on and after the disk media has achieved a rotational velocity that permits reading data therefrom.

5. A disk drive data storage device comprising:

at least one disk contained within a disk enclosure;

disk drive control circuitry positioned outside said disk enclosure;

control firmware including a first partition resident in said control circuitry and stored in erasable, programmable read only memory, a second partition stored on the disk, and a copy of the firmware first partition, compatible with said firmware second partition, stored on said disk surface;

means for determining if said firmware first partition, resident in said control circuit and said firmware second partition are compatible; and means responsive to a determination of incompatibility, for replacing said firmware first partition stored in said erasable, programmable read only memory with the copy of said firmware first partition stored on said disk surface.

6. The disk drive data storage device of claim 5 further comprising identifiers that form a part of each of said firmware partitions, said identifiers indicating the status and technical level of the partition of which it forms a part, whereby a comparison with other partition identifiers are implemented to ascertain compatibility or incompatibility.

7. The disk drive data storage device of claim 6 wherein said identifiers also include the identification of other firmware partitions with which the partition of which it forms a part will function correctly.

8. In a rigid disk data storage device having a disk assembly that is rotated during the read and write operations and including control firmware that has a first partition residing in erasable, programmable read only memory (EEPROM) outside the disk enclosure a second partition stored on the disk surface, and a copy of a first partition, compatible with said second partition, also stored on said disk surface, an incompatible firmware recovery method invoked as a part of the start sequence comprising:

spinning the disk assembly to a rotational velocity that permits stored data on a disk surface to be read;

comparing said firmware first partition residing in EEPROM with said firmware second partition stored on the disk surface to determine compatibility, continuing with the start sequence if compatibility is found; and erasing said EEPROM and reprogramming said EEPROM with the firmware first partition copy stored on said disk surface if incompatibility is found, following which the start sequence is continued.

9. In the rigid disk data storage device of claim 8 wherein each firmware partition includes an identifier, the method wherein the step of comparing said firmware first and second partitions comprises examining said identifiers to determine firmware compatibility.

* * * * *